United States Patent [19]

Clement

[11] Patent Number: 4,844,000
[45] Date of Patent: Jul. 4, 1989

[54] DIRECTION INDICATING CLAMP FOR ATTACHMENT TO FIRE FIGHTING HOSE LINES

[76] Inventor: Clifford Clement, 193 High St., Somerset, Mass. 02726

[21] Appl. No.: 164,195

[22] Filed: Mar. 4, 1988

[51] Int. Cl.$^4$ ............................................. G01D 21/00
[52] U.S. Cl. .......................... 116/205; 116/DIG. 17; 40/316; 138/104
[58] Field of Search ...................... 116/205, DIG. 17; 340/407; 40/639, 640, 665, 584, 316; 24/16 R, 16 PB, 20 R, 20 EE; 138/104; D23/266

[56] References Cited

U.S. PATENT DOCUMENTS

| | | | |
|---|---|---|---|
| 259,544 | 6/1882 | Howard | 116/205 |
| 1,192,152 | 7/1916 | Atkinson | 24/20 EE |
| 1,650,996 | 11/1927 | McDonnell | 116/319 |
| 2,491,699 | 12/1949 | Wing | 116/205 |
| 2,667,074 | 1/1954 | Whitehill | 138/104 |
| 2,787,975 | 4/1957 | Dunn | 116/63 P |
| 3,233,801 | 2/1966 | Schulenberg | 24/16 PB |
| 3,367,370 | 2/1968 | Sherlock | 138/1 |
| 4,080,087 | 3/1978 | Phillips | 404/72 |
| 4,246,712 | 1/1981 | Vander Wall | 40/316 |
| 4,401,050 | 8/1983 | Britt et al. | 116/205 |

*Primary Examiner*—William A. Cuchlinski, Jr.
*Assistant Examiner*—W. Morris Worth
*Attorney, Agent, or Firm*—J. Michael McClanahan

[57] ABSTRACT

The subject invention is a direction indicating clamp for attachment to fire fighting hoses which indicate direction to exit the building. The invention consists of an elongated band fully or partially encircling the fire fighting hose with attached directional fingers protruding perpendicularly from the band. The clamp is placed upon the hose at prescribed distances thereby allowing the fire fighter to continue feeling along the hose and eventually to exit the building. Various embodiments of the invention encase the flexible clamp with soft rubber or a cloth material. In addition, the directional fingers may have a pointed end or may have raised letters indicating the exiting direction.

12 Claims, 1 Drawing Sheet

DIRECTION INDICATING CLAMP FOR ATTACHMENT TO FIRE FIGHTING HOSE LINES

BACKGROUND OF THE INVENTION

1. FIELD OF THE INVENTION.

The field of the invention is devices which enable a fire fighter whose vision has been impaired such as by being in a dark or smoke filled building to utilize fire hose lines to find the source of the initial hose connection and thus his way out of the building.

2. DESCRIPTION OF THE RELATED ART.

One of the primary concerns of fire fighting personnel is that of becoming lost in a burning building or smoke filled building where the fire fighter does not know which direction is outside. It is common when these incidents happen for the fire fighter to follow the hose lines, knowing that the hose connects from the outside source of water to the water spraying nozzle at the fire. However, if the fire fighter has lost his sense of direction, or does not even know which direction is "out", he takes a 50% chance in following the hose lines that he will follow in the wrong direction. This is most especially true when he's not at the spraying nozzle end of the hose. Even then, if the hose from the nozzle becomes a jumbled mass by doubling back on itself before it returns to the water pumper, or a multiple of hoses are used during the fire, the fire fighter may be placed to a great deal of difficulty to continue in a direction initially started since it would be very easy to lose a particular hose or at least the direction in the same hose if it goes into a jumbled mass. Consequently, in such a situation, it might be necessary for the fire fighter to retreat to the periphery of the jumbled mass to choose another hose to follow and then he again has only a 50% chance of selecting the correct direction to follow.

While there are a plethora of information transmitting placards or other devices which are sensitive to one's feel, yet these devices reside primarily in the areas available to the blind, such as braille, or are devices which are embedded into roadways which inform a pedestrian, or an automobile, that they have done a certain thing or are about to do something. For example, Dofsen, in U.S. Pat. No. 2,574,990 has devised a method of preparing roadways so that a rumble is given off by automobile tires as they roll over it such as to warn of an approaching danger, for example, railroad tracks. Furrey, in U.S. Pat. No. 1,647,861 and Hoff, in U.S. Pat. No. 1,698,594 show markers having raised studs or projections designed to be emplaced in roads indicating such information as zoning for pedestrians, crosswalks, and the like. These are warnings intended for the pedestrian, in walking upon the markers, to feel and know that they are in or are approaching such a zone.

However, to the Inventor's knowledge, no markers or other identification has been placed upon fire hoses or the like as a safety measure to allow fire fighters or other parties trapped in a building where visibility has been lost to be able to ascertain direction to the outside by knowing assuredly through an identification means that a hose is leading to the outside and not further into the building.

Accordingly, it is apparent that a device which attaches to a fire fighting hose which at all times points to the source of initial hose connection, i.e., in the direction of the water pumper and the outside of the building, would be obviously a very important factor in helping fire fighters or other persons lost in a burning building or a smoke filled building in being able to follow the fire hose to exit the building.

SUMMARY OF THE INVENTION

This invention relates to a direction indicating clamp for attachment to a fire fighting hose line which is installed upon the hose line prior to taking the hose line interiorly to a building during the fire fighting. The clamp is characterized by a flat elongated band which partially encircles the hose line and by a plurality of direction indicating fingers attached at a perpendicular angle to the longitudinal direction of the elongation of the encircling band, the direction indicating fingers pointing in the direction of the source of initial hose connection, which in this case is by definition, the connection of the hose to a point outside the building or to an area safely away from the fire.

In practice, the direction indicating clamp encircling band comprises a "C" type clamp and in the preferred embodiment may be slipped over the hose as the hose is pulled off the fire truck, or, in an alternate embodiment, may be secured around the hose so that it resides with the hose at all times, even during times of storage. The clamp is characterized by being constructed of thin spring steel, or other types of flexible materials, such as, for example, plastic, in order that it may flex with the hose and certainly not serve as an obstruction to flow of water by engaging the hose such as to restrict its inside diameter.

In an alternate embodiment in which the band completely surrounds the fire fighting hose, the band is fitted with a clasp at its ends, the clasp such that the two ends of the band may be locked together as the ends overlap.

In additional alternate embodiments of the invention, the directional fingers are modified to have pointed ends or to have raised letters with the word "Exit" or other similar word placed thereon.

It is an object of the subject invention to provide a clamp surrounding a fire fighting hose which indicates direction of the hose to the source of initial hose connection.

It is another object of the subject invention to provide a direction indicating clamp for attachment to fire fighting hoses which may be easily placed upon the hose, or easily removed as desired.

It is still another object of the subject invention to provide a direction indicating clamp for attachment to a fire fighting hose which is attached permanently around the hose and which provides no or little obstruction to the use and storage of the hose.

It is still another object of the subject invention to provide a direction indicating clamp for fire fighting hoses having a plurality of direction indicators which indicate the direction to the outside of a building that the hose is running in.

Other objects of the invention will in part be obvious and will in part appear hereinafter. The invention accordingly comprises the apparatus and method comprising the construction, combination of elements, and arrangement of parts which are exemplified in the following detailed disclosure and the scope of the Application of which will be indicated in the Claims.

BRIEF DESCRIPTION OF THE DRAWINGS

For further understanding of the nature and objects of the present invention, reference should be had to the following detailed description taken in connection with the accompanying drawings wherein.

In various views, like index numbers refer to like elements.

DETAILED DESCRIPTION OF THE PREFERRED EMBODIMENT

Figure 1:
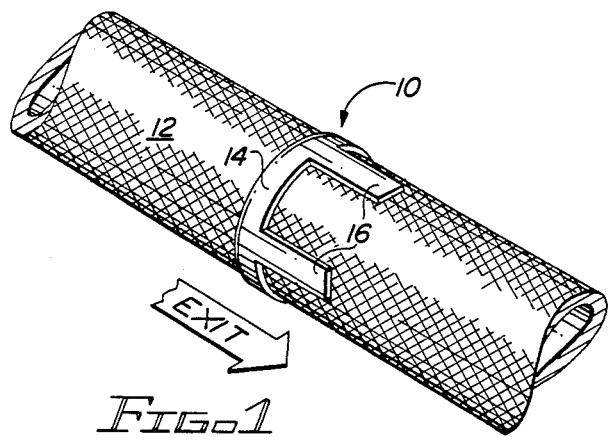
FIG. 1 is a perspective view of the invention in place on a fire fighting hose.

Referring now to FIG. 1, a perspective view of the subject direction indicating clamp 10 for attachment to fire fighting hose lines is shown in place on a hose where for illustrative purposes, but not part of the inventive device, is seen an arrow marked "Exit" pointing in the direction to the source of initial hose connection, the water pumper, and more importantly, the direction out of the building that the hose runs into. As seen in FIG. 1, direction indicating clamp 10 partially encompasses hose 12 with encircling flat elongated band 14, band 14 characterized by attached protruding elongated extension directional fingers 16. Directional fingers 16 point perpendicularly from the longitudinal direction of the elongation of band 14 and towards the direction out of the building. It is anticipated that there shall be a plurality, at least three, direction indicating fingers 16.

In the use of the invention, it is suggested that the direction indicating clamps be placed upon the fire fighting hoses at distances of 10 feet apart and that they be placed upon the hoses prior to the hose being carried into the burning building.

Since it is anticipated that the device will in most cases be needed when a building is dark or when the building is so smoked filled that visibility is substantially reduced, the lost fire fighter, in trying to get out of the building, will seek out the water hoses laying on the floor and by running his hands along the hose until he comes to a direction indicating clamp, will be given the direction out. Since hoses may well be doubled upon themselves or trace out a circle, it will be necessary for the fire fighter to continue feeling along the same hose and by doing so, will follow that same hose to the outside of the building. In the event that many lines are mass jumbled in a room in a building and it becomes impossible to follow the same hose, all the fire fighter need do then is to move around the jumbled hose mass to an area away from the jumbled mass and there finding a direction indicating clamp can again ascertain the direction out. If the directional fingers indicate that the hoses are going into the jumbled mass, the fire fighter need only find another point around the jumbled mass where the direction indicating clamps show that the hoses lead away from the jumbled mass and thus to outside the building. The theretobefore lost fire fighter need only to continue feeling along the hose, going from one direction indicating clamp to the next, ascertaining at each clamp that he is continuing in the proper direction to the outside to work his way out of the building and to safety.

Figure 2:
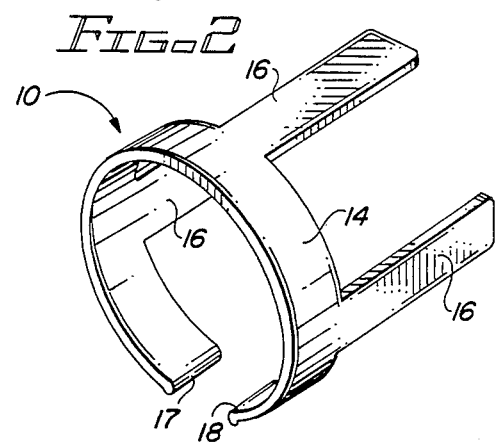
FIG. 2 is a perspective view of the subject invention viewed from the end opposite that of FIG. 1.

FIG. 2 is a perspective view of the subject direction indicating clamp 10 removed from a fire fighting hose and viewed from the partially encircling band end. Readily seen is encircling band 14 which is adapted to encircle substantially the total circumference of the hose, at least in the order of 90% or so, with each of the two ends 17 and 18 rolled back in order to present a smooth rolled over finish. With such rolled over end, the band is less likely to gouge or puncture the hose, or for that matter, the hand of the party placing the clamp upon the hose, removing the clamp from the hose, or feeling along the hose to discover the clamp and the direction of its fingers. Protruding perpendicularly from the longitudinal direction of the band are the plurality of elongated extensions forming the directional fingers 16, where here, all three of the directional fingers of the preferred embodiment are shown.

In the preferred embodiment, the direction indicating clamp 10 is constructed from spring type flat steel with the width of the band 14 and fingers 16 in the order of a half inch or so. The thickness of the flat steel is not critical, although it can range between 1/64th. inch to 1/16th. inch as desired. The inventive direction indicating clamp need not be made of steel, it could also be made of plastic or any other type of relatively flexible, though durable material. The subject direction indicating clamp may be placed upon fire fighting hose as the hose is removed from the truck and carried into the building, or the clamp may be placed onto the hose and left on the hose permanently. In the case where the clamp is intended to remain on the hose, the clamp is preferably formed in an oval shape since most fire fighting hoses are stored by allowing the hose to collapse. With the clamp taking an overall oval shape, yet still being flexible, it does not present an obstacle to storage of the hose and one of the alternative embodiments of the device later discussed shows the band having an oval shape. Also, as shown in FIG. 2, the outstanding ends of directional fingers 16 may be rounded.

In addition, it has been found useful to encase the spring steel inventive clamp in a protective coat of soft rubber, or, to surround it with a sewed cloth material, such as a hard wearing nylon or the like. In either of these embodiments utilizing coverings, direct contact between metal and the hose, or metal and the person is avoided, or with water to avoid rust.

Further, it has also been found useful to have the inventive clamp take on a highly reflective surface. In respect of this, the spring steel may be the type which is reflective, or it may be plated with a reflective coating, such as chromium. In addition, if the clamp is made of plastic or has the rubber coating, reflective materials may be introduced into these materials during their manufacture. In the event that the clamp is cloth covered, reflective cloth should be used. The obvious reason for making the clamp highly reflective is that the clamp would be more readily observed with a flashlight or other source of present light.

Figure 3:
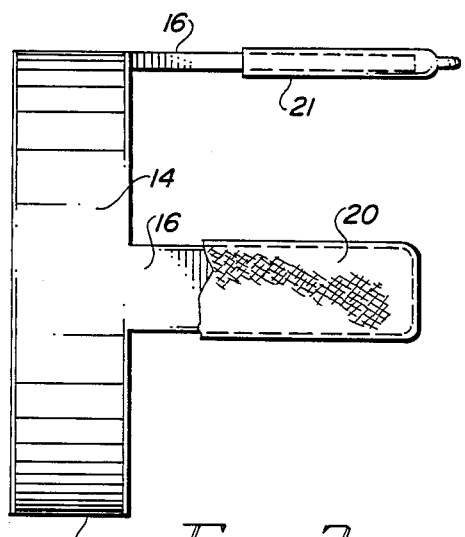
FIG. 3 is a side view of the subject invention.

Referring now to FIG. 3, a side view of the inventive directional clamp 10 is shown detailing band 14, direction indicating fingers 16, and the bottom end 18. Immediately behind the finger 16 shown in the approximate middle of FIG. 3 is located the third finger 16 (not shown). Also shown in FIG. 3 is a partial view of rubber coating 20 which may cover the entire clamp, and a partial view of cloth cover 21 which also may cover the entire clamp.

Figure 4:
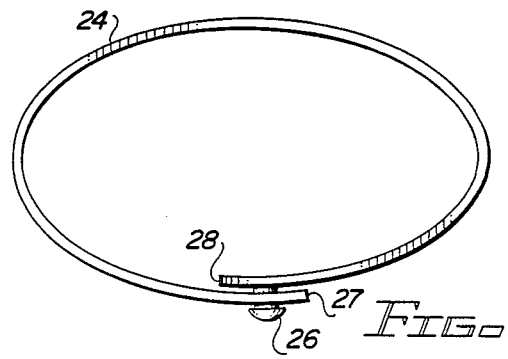
FIG. 4 is an end view of an alternate embodiment of the subject invention.
Figure 5:
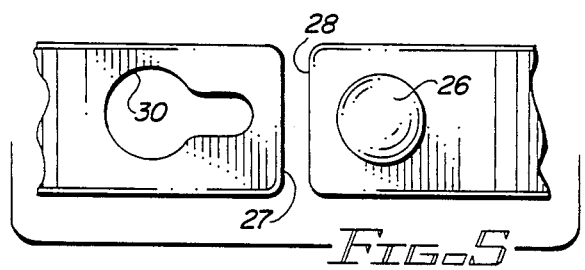
FIG. 5 is a top view of the ends of the alternate embodiment of the subject invention shown in FIG. 4.

Continuing, an alternate embodiment referred to above is shown in FIG. 4 where the clamp has been modified in two respects, the first being that its normal resting shape has taken a oval configuration and, the rolled over ends 17 and 18 in the preferred embodiment have been modified and lengthened so that they overlap. Now, a clasp mechanism comprising an outward protruding knob 26 is attached to a stem which in turn is attached to end 28 of band 24. At the other end 27 of band 24 has been formed a keyhole shaped opening adapted to allow knob 26 to pass through and then to secure the stem in the narrowing of the opening. Reference to FIG. 5 showing a top view of the ends 27 and 28 illustrate the keyhole shaped opening 30 and the top of knob 26. Obviously, knob 26 passes through the larger opening area of opening 30 and the stem (shown in FIG. 4) which connects knob 26 to end 28 of encircling band 24 is secured in the narrowed elongated opening portion of opening 30 at end 27 of band 24.

It is anticipated that the alternate embodiment of the invention shown in FIGS. 4 and 5 is intended to be permanently emplaced around the fire fighting hose and to remain with the hose even during periods of storage. Knob 26 shown in FIG. 4 first appears to be an obstacle to efficient storage of the fire hose, however, it is obvious that knob 26 and its connecting stem may be so constructed as to present in fact, very little obstacle. For example, the stem attached to knob 26 which in turn attaches to end 28 of band 24 may be very short, only, perhaps, a little longer than the thickness of band 24, and the top head configuration of knob 26 may be rounded so that it presents little or no obstruction to any other surface rubbing over it, or catching on it.

Figure 6:
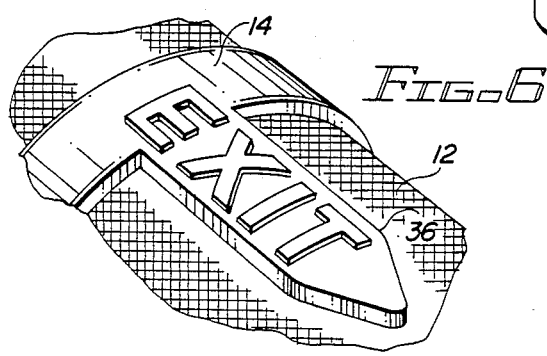
FIG. 6 is a perspective view of an alternate embodiment of the invention.
Figure 7:
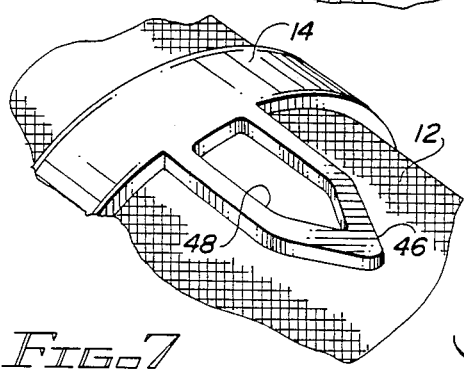
FIG. 7 is a perspective view of another alternate embodiment of the subject invention.

In FIGS. 6 and 7, variations in the configurations of directional fingers 16 are shown. For example, in FIG. 6, directional finger 36 has acquired a pointed end to additionally inform the party the direction to the outside and the raised letters "Exit" have been added to the finger 36. Like before, band 14 surrounds hose 12.

In FIG. 7, directional finger 46, like directional finger 36 of FIG. 6, is also pointed, and to reinforce the direction indicated by finger 46, an opening 48 has been formed in directional finger 46, the opening also taking the shape of a directional finger. Here again, like FIG. 6, band 14 connecting to direction finger 46 encompasses hose 12.

Figure 8:
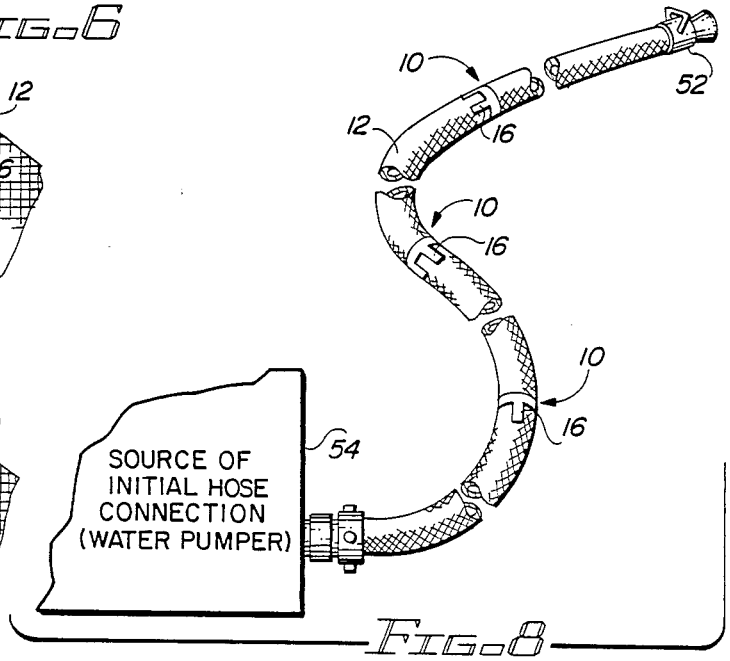
FIG. 8 is a diagrammatic representation of the invention in use.

Lastly, referring to FIG. 8, a diagramic figure of the invention shown in use is detailed. Firstly illustrated is the water carrying hose 12, having at one end nozzle 52, and at the other end, the source of initial hose connection 54 which, in most cases, will be a water pumper. Located at various points along hose 12 is the inventive clamp 10 with its directional finger 16 pointing in the direction of the source of initial hose connection 54.

While a preferred embodiment of the inventive device, together with alternate embodiments, has been shown and described, it will be understood that there is no intent to limit the invention by such disclosure, but rather it is intended to cover all modifications and alternate constructions falling within the spirit and the scope of the invention as defined in the appended Claims.

I claim:

1. A direction indicating clamp for attachment to flexible fire fighting hoses to indicate direction to the source of initial hose connection, the direction indicating clamp comprising:

an elongated flexible band for attachment about an associated fire fighting hose, said band having a longitudinal axis in the direction of its elongation; and a directional flexible finger attached to said band, said finger defining an elongated extension attached at an angle perpendicular to said band longitudinal direction, said finger indicating the direction to the source of initial hose connection whereby a person, by examining a feeling the fire fighting hose, may ascertain the direction to the source of the initial hose connection and by following the fire fighting hose in the direction indicated, shall arrive at the initial hose connection.

2. The direction indicating clamp as defined in claim 1 including a plurality of directional fingers.

3. The direction indicating clamp as defined in claim 2 wherein each said directional finger defines an elongated extension with a pointed end.

4. The direction indicating clamp as defined in claim 3 wherein said directional fingers include direction indicating words written upon said fingers.

5. The direction indicating clamp as defined in claim 3 wherein said directional fingers include an opening formed in said fingers, said opening so formed as to also indicate direction.

6. The direction indicating clamp as defined in claim 3 wherein said band defines a flat strip with opposite ends, and said band configured to form a partial circle adapted to permit easy placement and easy removal on the associated fire fighting hose.

7. The direction indicating clamp as defined in claim, 3 wherein said band defines a flat strip with a first and second end, and said band configured to form a circle with ends overlapping.

8. The direction indicating clamp as defined in claim 7 wherein said first overlapping end includes an opening therethrough, and said second overlapping end includes an outwardly protruding knob, said knob adapted to be placed through said opening to secure said direction indicating clamp about the associated fire fighting hose.

9. The direction indicating clamp as defined in claim 6 wherein said band and said directional fingers comprise flat spring steel.

10. The direction indicating clamp as defined in claim 6 wherein said band and directional fingers comprise plastic.

11. The direction indicating clamp as defined in claim 6 wherein said band and said directional fingers are encased in a cloth material.

12. The direction indicating clamp as defined in claim 6 wherein said band and said directional fingers are encased in rubber.

* * * * *